Oct. 22, 1968     G. L. VESEY     3,406,593
LIMITED SLIP DIFFERENTIAL MECHANISM
Filed Sept. 15, 1966
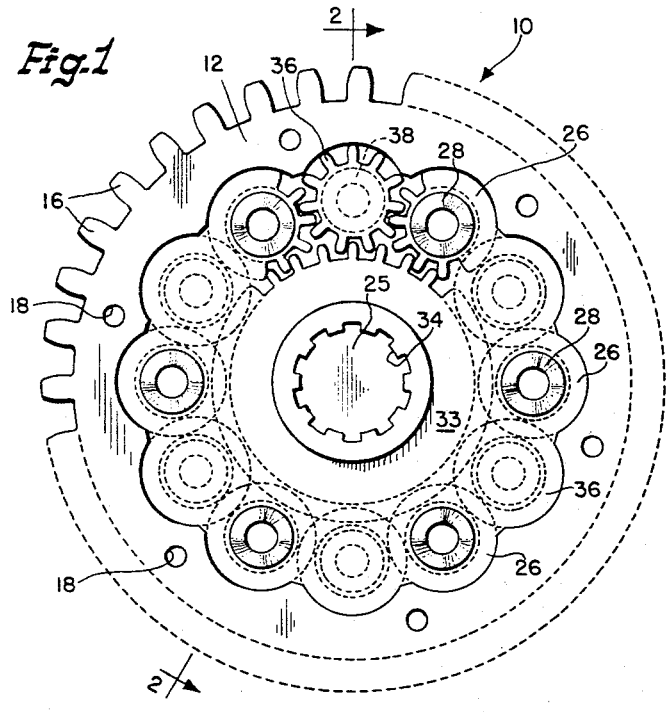
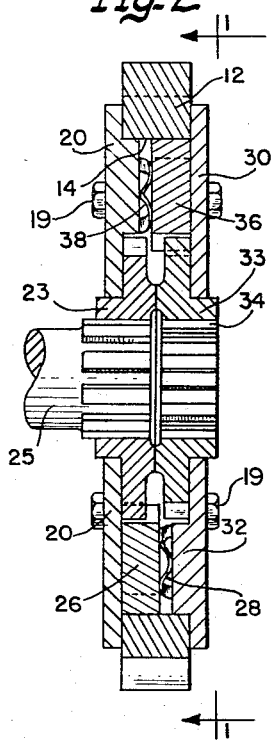
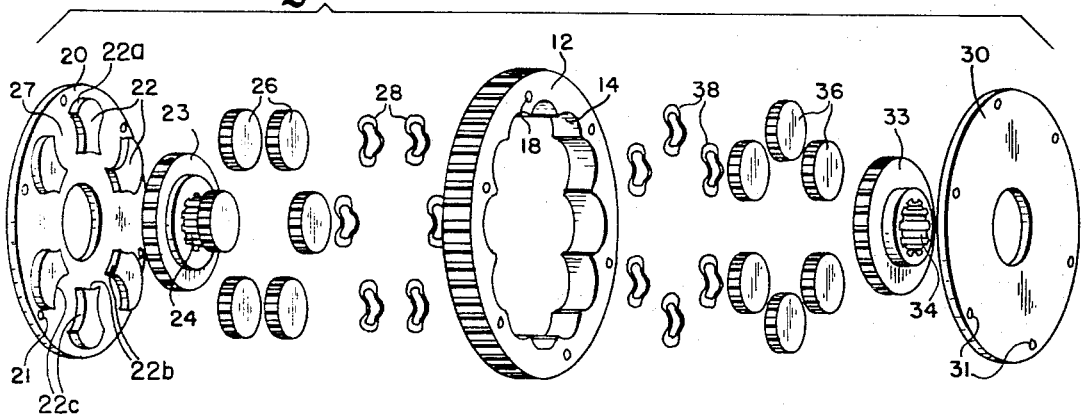
INVENTOR.
Gary L. Vesey
BY Barry L. Clark
Robert W. Beart
His Att'ys

United States Patent Office 3,406,593
Patented Oct. 22, 1968

3,406,593
LIMITED SLIP DIFFERENTIAL MECHANISM
Gary L. Vesey, Elk Grove Village, Ill., assignor to Illinois Tool Works Inc., Chicago, Ill., a corporation of Delaware
Filed Sept. 15, 1966, Ser. No. 579,730
7 Claims. (Cl. 74—711)

ABSTRACT OF THE DISCLOSURE

Limited slip differential increases inefficiency of planetary gear type differential wherein pinions are arranged in two orbits in full circle mesh with each other and with their teeth and ends in frictional engagement with a carrier member, by providing a resilient biasing means for exerting compressive forces against the pinions so as to increase the friction force between the pinions and their supports.

---

This invention relates to limited slip or inefficient differentials of the planetary gear type, and more particularly to a means of introducing an initial breakaway torque into such a differential to give it a limited slip characteristic and decrease its efficiency.

The transmission of torque to drive wheels, generally two in number, so that each wheel can have a different speed of rotation relative to the other, requires the use of a differential mechanism. The differentiation between wheels which it makes possible, provides for transmission of power to both wheels while the vehicle is turning a corner, for example, during which time relative motion is required to eliminate what would otherwise be wheel bounce or skidding caused by unequal distances traveled by the two wheels. However, in permitting such differentiation under different relative wheel speeds, conventional differentials also permit one wheel to spin if that wheel possesses relatively less tractive ability (such as provided by ice or mud) than that of the other drive wheel. The total tractive ability of the vehicle is then essentially limited to the tractive effort of the least tractive wheel.

Many methods and means of restricting such relative rotation under slippery conditions have been developed, these including systems which completely lock the wheel having the least tractive ability, systems where the differential gears are locked for movement with their case when the relative movement between the gears and case exceeds a predetermined amount, and the use of overrunning clutching means to introduce friction in various ways. Generally, these devices have not found widespread application in differential construction because of the added expense of using special manufacturing techniques in producing a complicated design. Many devices utilizing clutches have a relatively short useable life since they wear quite rapidly and are difficult to lubricate properly. In certain forms of differentials, there is often reduced strength and reliability introduced.

Accordingly, it is an object of this invention to provide a differential of a spin limiting sort tending to reduce relative motion between two axles when the wheels on the axles engage surfaces of widely differing coefficients of friction—without impairment to efficient transmission of power in the absence of differentiation requirements.

A further object of this invention is to provide a simple, inexpensive slip limiting differential.

A still further object of this invention is to increase the spin limiting properties of a differential of the type disclosed in co-pending application, Ser. No. 363,934, filed Apr. 30, 1964, now Patent No. 3,292,456, wherein inefficiency is derived from the friction caused by mounting the pinions loosely in the bearing pockets.

These and other related objects are achieved in the present invention by the use of biasing means such as spring members in differentials of the side or sun gear and meshing pinion or planetary gear variety, these spring members being mounted relative to the gears so as to exert a compressive force thereon and thus oppose the rotation of the gears relative to their case.

The present invention is broadly related to the invention set forth in great detail in the previously referenced application assigned to a common assignee, in that in both cases, friction and rubbing are relied upon to increase the inefficiency of a differential. However, in the instant invention, the frictional force is derived mainly from the application of a resilient compressive force to the gears, such as by the use of spring members to cause them to rub against a portion of their bearing supports. Since springs can be chosen which will exert different degrees of compressive force, it is obvious that the inefficiency of the differential can be varied over a large range. Although the application previously referred to teaches many means for obtaining an inefficient differential, the present invention permits an increase to be made in the inefficiencies of such differentials.

When an axial bias is applied to any of the gears in the differential of the present invention, the gears become frictionally engaged with their housing on their end faces. Since the coefficient of friction is much greater when the gears are stopped as compared to when they are moving, it can be seen that the present differential will prevent one wheel of a vehicle from moving relative to the other until a predetermined breakaway torque is exceeded. Thus, when a vehicle is just starting to move out of a location where one wheel is in engagement with a surface offering little resistance to slip, a large amount of torque can still be transferred to the other wheel to help get the vehicle moving.

Further detailed description of the invention can be had by reference to the drawings in which FIG. 1 is a sectional axial view with the right cover removed taken along lines 1—1 of FIG. 2.

FIG. 2 is an axial section of that form of the invention shown in FIG. 1, this section taken along lines 2—2 of FIG. 1.

FIG. 3 is an exploded assembly of the component parts of the same embodiment of the invention shown in FIGS. 1 and 2.

FIGS. 1–3 show the preferred embodiment of my differential 10. Referring particularly to FIG. 3, the differential includes a differential case member 12 which has internal escalloped pinion supporting walls 14 whose purpose will be described later. The differential case 12 preferably has formed on its exterior peripheral surface, an integral ring gear 16 having teeth adapted to receive the engine torque which the differential then transmits to a pair of axles connected to it. It is to be understood that the ring gear is merely representative of one form of gearing which could be used to transmit torque. In addition to gearing, it would of course also be possible to employ other methods of transmitting power to the differential case 12 such as by belts and pulleys for example.

The differential case member 12 is adapted to be held in face-to-face contact with left end plate 20 and aligned therewith by means of bolts 19 passing through bolt holes 18 in case member 12 and bolt holes 21 in end plate 20. A plurality of bosses 22 are formed integrally with end plate 20. These bosses 22 extend for a limited axial distance toward the center of the differential case 12. The outer radial peripheries 22a of the bosses 22 are complementary in shape to the escalloped surface 14 of the differential case 12 which overlies them. The inner peripheries 22b of the bosses 22 are spaced radially away from the center of the end plate 20 an amount sufficient to permit a left side or sun gear 23 to be positioned in contact with the inner flat surface of the end plate 20. The side gear 23 includes an internal splined surface 24 adapted to be placed in driving relationship with the left splined axle 25 (FIG. 2). A plurality of left pinion or planet gears 26 are in an orbit and are spaced evenly about the interior of the differential case in left pinion pockets 27 defined by the left end plate 20 and the peripheral side walls 22c of the bosses 22. The pinions 26 are mounted in pockets 27 and held in pressure contact with the end plate 20 by passing means such as spring washers 28.

The right side of the differential is substantially identical to the left side and the elements thereof have been numbered so that the second digit of the reference characters are the same as those used to describe the left side. Thus, the right hand portion of the differential includes right end plate 30 which is identical to left end plate 20 and adapted to be drawn towards plate 20 by fastening means such as bolts or rivets 19 passing through holes 31, 18, and 21. The right end of the differential includes bosses 32 which are hidden from view in FIG. 3, a right side or sun gear 33 having an internal splined surface 34, and a set of right pinion or planet gears 36 positioned in pockets formed by the end plate 30 and the bosses thereon. The pinions 36 are held in pressure contact with right end plate 30 by a biasing means such as spring washers 38.

It is evident in FIGS. 1 and 2 that the pinions 26, 36 mesh with each other in a full circle of engagement. However, it should be noted that adjacent pinions are only in mesh with each other for a short portion of their axial length near the center of the differential. The remainder of the axial length of pinions 26 is in mesh with left side gear 23 while the remainder of the axial length of right pinion gears 36 is in meshing engagement with right side gear 33. This arrangement of partial engagement is necessary if the gears are to act as a differential and would allow a clockwise movement of gear 33 in FIG. 3 to be transmitted to pinions 36, and then from pinions 36 to pinions 26 which in turn would drive left side gear 23 in a counterclockwise direction.

Since the pinions 26, 36 do not have pinion supporting shafts but are mounted loosely in bearing pockets, it is evident that the teeth of the pinions will rub against the inner walls 14 of the differential case 12 and the side edges 22c of the bosses 22, 32 and provide a substantial source of friction. The friction produced by the rubbing of the pinion teeth and end surfaces on their bearing supports is increased by the application of a resilient compressive force to the pinions and results in limited slip characteristics which exceed those of a differential having a resilient force applied to gears which are mounted on shafts.

In the embodiment described, the spring washers placed coaxially with the pinions are shown acting on only one end of each of the pinions in which case rotation of the gear is also resisted on its opposite end by the corresponding end plate. However, it is to be understood that the washers could be positioned on the other ends of the pinions. Also, a second spring washer could be positioned on the other end of each pinion between the pinion and the end plate if a more specific locationing of the resistive surface and forces should be desired.

Whatever the positioning and the numbers of spring members that may be used, it is necessary that the members be under compression, the amount of compression being obtained in the case of a spring washer, by selection of a suitable overall dimensional thickness of the washer, by the size of the space in which it is axially confined, and by the choice and thickness of material from which the spring washer is formed. In essentially all cases the choice of material for the washers will be spring steel, this being heat-treated steel providing optimum durability in service.

Although the foregoing broad designation of perforated spring washers has been pictured in the form of undulating or multiple wave washers coaxial with the planetary pinions, other forms of spring member biasing means such as coil springs and various types of spring washers or rings are within the contemplation of this invention. Examples of spring washers would include, but not be limited to, single wave washers, C-washers, frusto-conical washers and dome washers. Generally to be preferred is that form of spring washer which has a continuous periphery on both of its surface contacting edges or flanged faces so that there is a circumferentially complete distribution of the rotational resisting forces within the washer. Some forms of spring washers would probably find less application in the practice of this invention because of smaller load bearing faces or an incomplete periphery which would produce higher load concentrations and possible accentuated scoring of the planetary gear or end plate surface.

In those instances where a pair of spring washers would be used in abutting relationship, consideration in the selection of washer types must be given to the fact that forms of washers with an interrupted face or an interrupted periphery might interlock with the edge or face of one washer passing under the edge or face of the other. Such could happen with C-washers, for example. In other types of spring washers such as single or multiple wave washers, their use in pairs will have only the effect of increasing one washer's compressive strength. Since the two washers will nest as relative rotation brings them into similar relative rotational positions.

With the many modifications both mentioned and implicitly present, there is no intention to limit the scope of the invention except as indicated in the following claims:

1. A limited slip differential comprising:
   rotatable differential case means, including a carrier member and at least one cover member;
   a pair of side gears in said case adapted to be operatively engaged by a pair of axles entering opposite sides of said case;
   a plurality of first pinion gears in a first orbit in meshing engagement with one of said pair of side gears;
   a plurality of second pinion gears in a second orbit in meshing engagement with the other of said pair of side gears;
   each of said first pinions being in meshing engagement with two of said second pinions;
   bearing means for mounting said first and second pinion gears in said case means so as to support them solely on their toothed surfaces and their end surfaces;
   said bearing means including a plurality of pinion supporting wall surfaces in said carrier member, each of said wall surfaces supporting a portion of the teeth of one of said pinions and adapted to absorb frictional rubbing forces from said teeth;
   said bearing means further including a plurality of end support surfaces in said differential case means for supporting said pinions and preventing the pinions in said first and second orbits from moving axially into engagement with the side gears meshing with the pinions in the second and first orbits respectively; and
   resilient biasing means exerting a compressive force against at least one of said pinions in the direction of at least one of its supporting surfaces so as to increase the friction force between said pinion and its said one support surface to partially oppose its rotation.

2. A limited slip differential according to claim 1 wherein the resilient biasing means comprises spring washer means.

3. A limited slip differential according to claim 2 wherein the spring washer means is arranged coaxially of its associated gear so as to exert an axial compressive thrust thereon.

4. A limited slip differential according to claim 2 in which said spring washer means is selected from the group consisting of undulating washers, dome washers, and frusto-conical washers.

5. A limited slip differential according to claim 2 wherein said spring washer means is in engagement with each of said first and second pinion gears.

6. A limited slip differential in accordance with claim 1 wherein said rotatable differential case comprises:
   a carrier member;
   a pair of end plate members attached to the carrier member and covering the ends of the carrier member;
   said plurality of pinion supporting walls in said carrier member defining an escalloped peripheral pinion supporting surface;
   said plurality of end support surfaces comprising spaced integral bosses formed on each of said end plate members, said bosses being adapted to cooperate with the escalloped surface of said carrier member to form bearing pockets for said pinions, each of the spaced bosses on one end plate being positioned circumferentially between a pair of spaced bosses on the other end plate, the bosses on each end plate extending an axial distance which is sufficient to prevent the pinions supported by the bosses from meshing with the side gear supported by the same end plate, while permitting the pinions in the first orbit to mesh with the pinions in the second orbit.

7. A method of increasing the limited slip properties of a planetary gear differential comprising the steps of:
   mounting the planetary gears in a housing so that tooth and end portions of the planetary gears will be in rubbing frictional engagement with portions of the housing, and
   applying a resilient compressive force to the planetary gears with a spring member so as to increase the friction force between the planetary gears and the housing.

References Cited

UNITED STATES PATENTS

| | | | |
|---|---|---|---|
| 1,203,085 | 10/1916 | Wallace | 74—710.5 |
| 2,778,246 | 1/1957 | Thornton | 74—711 |
| 2,786,366 | 3/1957 | Tallakson | 74—711 |
| 2,821,096 | 1/1958 | Lyeth | 74—711 |
| 3,060,765 | 10/1962 | Rinsoz | 74—710.5 |
| 3,097,545 | 7/1963 | Immel | 74—711 |
| 3,264,901 | 8/1966 | Ferbitz et al. | 74—711 |
| 3,276,290 | 10/1966 | Randall | 74—711 |

FOREIGN PATENTS 888,808   9/1953   Germany.

ARTHUR T. McKEON, *Primary Examiner.*